(12) United States Patent
Shida et al.

(10) Patent No.: US 6,807,451 B2
(45) Date of Patent: Oct. 19, 2004

(54) SECURE ORDER-RECEIVING, DESIGNING, MANUFACTURING AND DELIVERY SYSTEM FOR A PACKAGING MEDIUM

(75) Inventors: Katsuhiko Shida, Sendai (JP); Hiroto Shibata, Sendai (JP)

(73) Assignee: Sydek Co., Ltd., Sendai (JP)

( * ) Notice: Subject to any disclaimer, the term of this patent is extended or adjusted under 35 U.S.C. 154(b) by 445 days.

(21) Appl. No.: 09/948,779

(22) Filed: Sep. 10, 2001

(65) Prior Publication Data

US 2002/0137615 A1 Sep. 26, 2002

(30) Foreign Application Priority Data

Mar. 26, 2001 (JP) .......................................... 2001-088444

(51) Int. Cl.[7] .......................... B31B 49/00; G06F 19/00
(52) U.S. Cl. ........................ 700/97; 700/182; 700/105; 700/117
(58) Field of Search ............................. 700/96–98, 105, 700/117, 180–182, 197, 237; 345/964–970

(56) References Cited

U.S. PATENT DOCUMENTS

| | | | | |
|---|---|---|---|---|
| 5,267,171 A | * | 11/1993 | Suzuki et al. ............... | 364/479 |
| 6,295,513 B1 | * | 9/2001 | Thackston ..................... | 703/1 |
| 6,647,305 B1 | * | 11/2003 | Bigelow ....................... | 700/97 |
| 6,654,653 B1 | * | 11/2003 | Heneveld et al. ............. | 700/97 |
| 2002/0072821 A1 | * | 6/2002 | Baker .......................... | 700/98 |
| 2002/0120920 A1 | * | 8/2002 | Jayaram et al. ............. | 717/137 |

* cited by examiner

Primary Examiner—Leo Picard
Assistant Examiner—Sean Shechtman
(74) Attorney, Agent, or Firm—Snider & Associates; Ronald R. Snider

(57) ABSTRACT

A system for order-receiving and delivery of a packaging medium adapted to package an article, which includes whole ordering and delivery processes concerning the packaging medium. This system allows a client to effect a data receiving and transmission with a designer and obtain an individual ID from the designer so that a basic data is transmitted from the client to a terminal server owned by the designer. In the system, the designer has an arithmetic unit by which the basic data is converted into a design data, and the client can take one or more actions to check to see if such design data complies with conditions and requirements proposed by the client, or not. After that checking, the design data is transmitted to a manufacturer who then manufactures packaging medium according to the design data and delivers resulting packaging medium to the client.

19 Claims, 5 Drawing Sheets

SECURE ORDER-RECEIVING, DESIGNING, MANUFACTURING AND DELIVERY SYSTEM FOR A PACKAGING MEDIUM

CROSS-REFERENCE

This application claims the priority of Japanese Patent Application No. 2001-088444, filed on Mar. 26, 2001, which is incorporated herein by reference in its entirety.

BACKGROUND OF THE INVENTION

1. Field of the Invention

The present invention relates to an order-receiving and delivery system concerning a packaging medium or packing material(s), which is based on whole ordering and delivery processes involving an initial ordering stage where a client places an order with a desired packing material(s) suited for neatly packing an article along its outer shape, and a final delivery stage where a resulting packing material(s) is/are delivered to the client.

2. Description of Prior Art

Typically, a packaging medium or packing material is used to cover and pack an industrial commodity or article before shipment thereof, so that the article is protected against a great impact and damages when being subjected to drop and vibration in transit.

The packing material itself varies in required specifications, raw materials used and structure, depending on the kind of commodity or article to be wrapped or packed by the packing material. For instance, in the case of audio goods, personal computers, display units or the like, a commonly used packing material is a foam buffer material (made of foam polystyrene) with a proper elastic property. Usually, some pieces of such foam buffer materials are attached to the corners and edges of each of those articles before packing it.

Also, to package high-precision instruments and parts, including liquid crystal display units, a particular tray with anti-static-electric property is employed, which has plural uneven areas to receive and retain the local parts of each of those goods against impact and vibration in transit FIG. 4 is a schematic diagram illustrating a conventional order and delivery process concerning the packing materials. According thereto, it is a common practice that a client 2 places an order with a manufacturer 6 for desired packing materials, as indicated by the solid arrows, and the manufacturer 6, upon receiving the order, manufactures ordered packing materials. Then, resulting packing materials are delivered from the manufacturer to the client 2, as indicated by the dashed arrows. Among the manufacturers 6, some of them (at 66) have their own designers and high designing technology to create various suitable packing materials, but in most cases, many of the manufacturers do not have such captive designers and sufficient designing expertise.

In designing a packing material, a designer has to consider a good aesthetic appearance of packing material a less cost in manufacturing the packing material, and a certain durability of resulting packing material, such as a resistance to impact, vibration and wear, as well as an improved packing efficiency and usability thereof. Normally, the process for designing such packing material is based on a typical two-dimensional designing, such as a hand-writing preparation of drawings or a computerized drawings preparation based on two-dimensional CAD (Computer Aided Design).

However, the foregoing conventional ordering and delivery processes have been with the problem that specific demands and requirements posed by a client for ordered packing material(s) are not precisely reported on to a designer because the client's demands are firstly treated by a packing material dealer or manufacturer and might be changed from what the client has expected, as a result of which, it is in most cases difficult to obtain a desired form of packing material that satisfies the client. Another problem with this process is that the manufacturer, who has received the order from the client, needs to contact the designer and request him or her to work on a packing material design, which therefore takes it extremely much time for a resultant packing material to be delivered to the client and inevitably increases the costs and price of packing material.

Also, at the stage where the designer attends to designing an ordered packing material, it is quite often the case that the client requests altering the design in the middle of the designer's work or immediately after his or her completion of designing work. Since the designing process requires a great deal of labor and a considerable amount of time at the designer's part, it is actually difficult for the designer to alter even a small part of the completed designs. Indeed, this partial alteration of design makes it annoyingly difficult for the designer to adjust the whole design in consistency with the altered part of design, and further raises a serious time-consuming problem which will force the manufacturer to extend delivery another date or month, with the result that a grave consequence and trouble may be caused in the trusted and good relation with the client.

Especially, some high-precision mechanical parts may require designing even at the initial stage of developing the corresponding new prototype products, in which case, a sudden alteration is quite often requested as to their specifications and shapes. This may result in the designer having spent much time and labor in vain for his or her works, and therefore, an improvement has been desired to the conditions and environments surrounding the client and designer in order to materialize direct and smooth exchanges of information between them.

On the other hand, there is the concern that a competitor dealer or manufacturer skilled in this particular packaging field will pretend to be an ordinary orderer, placing an order with a target packaging manufacturer in an attempt to gather any information on the designs for new packing materials. For, anyone with certain expertise in designing the packing materials and packing technology will be able to easily produce a similar packing material to the original one.

Recently, there have been increasing demands for new packing materials to pack any new product that will prevail in the market, such as new high-precision instruments including liquid crystal display units. Packing material manufacturers are also desired to produce more inexpensive and more reliable packing materials. This indeed requires a sustained improvement of designer's ability and it depends on a designer's own long experiences and many year's accumulation of design information, which is in a way a barrier against quick innovation of packing technology at the side of small and medium packing material manufacturers and will also raise the difficulty for them to find and increase new clients.

SUMMARY OF THE INVENTION

In order to solve the above-stated problems, an improved system for order-receiving and delivery of packaging medium is contemplated in the present invention. It is therefore a primary purpose of the present invention to provide an improved system for order-receiving and delivery of a packaging medium adapted to package an article, which includes an ordering step where a client places an order with an order receiver for the packaging medium; a designing step where a designer creates a design of the ordered packaging medium according to conditions and requirements proposed by the client; a manufacturing step where a packaging medium manufacturer manufactures a packaging medium on basis of the design as well as the client's conditions and requirements; and a delivering step where a resulting packaging medium thus manufactured is delivered to the client, characterized in that:

the designer is at least provided with:

a connection and communication means enabling the designer to receive and transmit a data from and to the client;

a terminal server including: an authentication server which, responsive to an access of the client, operates to determine whether an ID of the client is validated or not; and an extended authentication database which stores and controls a basic data transmitted from the client, as one record unit, together with one individual client information on the particular client; and an arithmetic unit for processing and converting the basic data into a design data; and the client is provided with:

a connection and communication means capable of establishing a connection to the terminal server; and an individual ID that qualifies the client to have an authorized access to the terminal server, wherein the client takes at least one or more actions to check to see whether the design data complies with the conditions and requirements proposed by the client, or not.

In a first aspect of the invention, the above mentioned data may comprise a basic data containing an information for design about the packaging medium, and the basic data may be automatically subjected to arithmetic computing by the arithmetic unit or subjected to arithmetic processing by the arithmetic unit and/or a manual processing, so that the basic data is converted into a design data.

In a second aspect of the invention, payment is effected from the client via the order receiver to the packaging medium manufacturer in settlement of the charges for the resulting packaging medium that has been delivered to the client.

In a third aspect of the invention, the designer and order receiver may be identical in entity with each other.

In a fourth aspect of the invention, the designer and packaging medium manufacturer may be identical in entity with each other.

In a fifth aspect of the invention, the client, prior to connecting to the terminal server, may at least obtain the individual ID and a program software from the designer, which program software is adapted for allowing connection of the client to the terminal server.

In a sixth aspect of the invention, the client, prior to connecting to the terminal server, may obtain a recording medium from the designer, which recording medium contains at least the individual ID and program software.

In a seventh aspect of the invention, there may be provided a designing process wherein the terminal server has a specification format provided therein, on the basis of which, a basic data is inputted in the extended authentication database, the basic data containing an information for design about the packaging medium, and the client may establish connection to the terminal server and input the basic data via the specification format in the extended authentication database of the terminal server, whereby the basic data is transmitted from the client to the designer.

In an eighth aspect of the invention, in connection with the designing process stated in the forgoing seventh aspect, the basic data is converted into a design data, and the client, after having established connection to the terminal server, may check to see whether the design data complies with requirements and conditions proposed by the client, or not, on the terminal server.

In a ninth aspect of the invention, the program software may include: a function for allowing connection to the terminal server; a function for creating a basic data which contains an information for design about the packaging medium; and a function for decoding and reconstituting said design data into an appropriate form of data readable and viewable by the client.

In a tenth aspect of the invention, in connection with the system stated in the foregoing ninth aspect, there may be provided a designing process wherein the client may creates the basic data, using the program software, thereafter establishes connection to the terminal server, and transmits the thus-created basic data to the designer.

In an eleventh aspect of the invention, in connection with the tenth aspect above, the client may receive the design data from the designer and check to see whether the design data complies with requirements and conditions proposed by the client, or not, via the program software.

Other various features and advantages of the present invention will become apparent from reading of the descriptions hereinafter, with reference to the annexed drawings.

DETAILED DESCRIPTION OF PREFERRED EMBODIMENT OF THE INVENTION

Figure 1A:
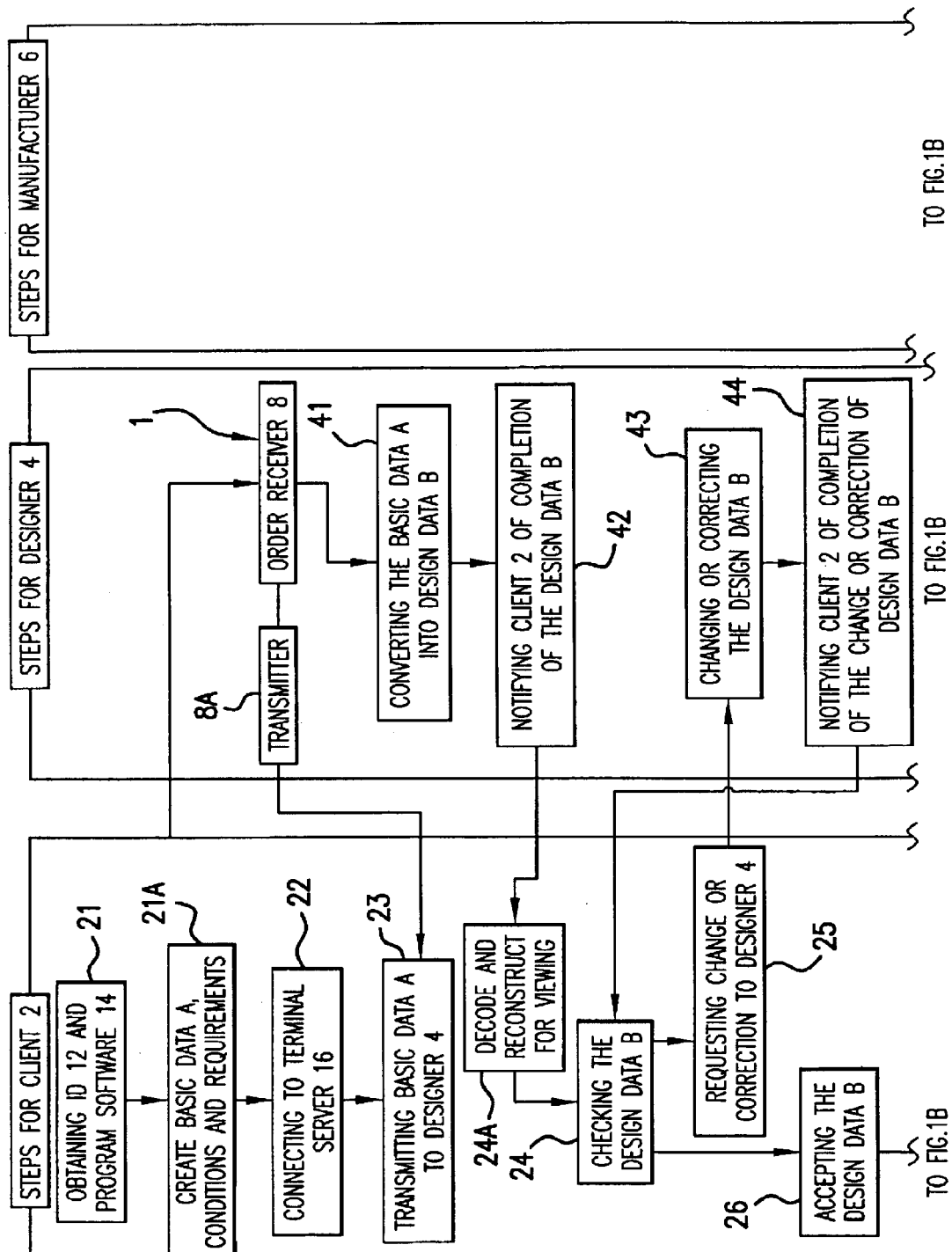
FIGS. 1A and 1B are flow charts illustrating one exemplary mode of an order-receiving and delivery system of a packing medium or packing material(s) in accordance with the present invention.

Referring to FIGS. 1A through 3, there is illustrated one exemplary mode of order-receiving and delivery system in accordance with the present invention, wherein a packaging medium or packing material(s), which has been described earlier, is/are to be ordered by a client(s), undergoing subsequent designing and manufacturing processes, and finally delivered to the client(s). Based on the illustrations in the figures, description will be made of the order-receiving and delivery system. It is noted, however, that the present invention is not limited to the illustrated embodiment. Hereinafter, the term, "packing material" or "packing materials", will be used, which refers to any kind of packaging medium suited for covering and packaging commodity and article.

The packing material order-receiving and delivery system of the present invention basically includes the following steps: an ordering step where a client 2 places an order with an order receiver 8 for desired packing material(s); a designing step where a designer 4 creates a design of the ordered packing material according to the conditions and requirements proposed by the client 2; a manufacturing step where a manufacturer 6 manufactures a packing material or a predetermined number of the packing materials (see the designation 7 in FIG. 3) on the basis of a design data prepared by the designer 4 about that design of packing material which meets the client's requirements and conditions; and a delivering step where the thus—manufactured resulting packing material(s) 7 is/are delivered to the client 2. Of course, a certain dealer or selling agency, who deals in packing materials, may be involved in the ordering step or at a proper point between the ordering and delivering steps, as desired. It is important that an order receiver 8 be provided at the ordering step to handle and control order(s) from client(s) so that the basic data is smoothly transmitted to the designer 4 who concentrates on designing the ordered packing material(s).

Figure 3:
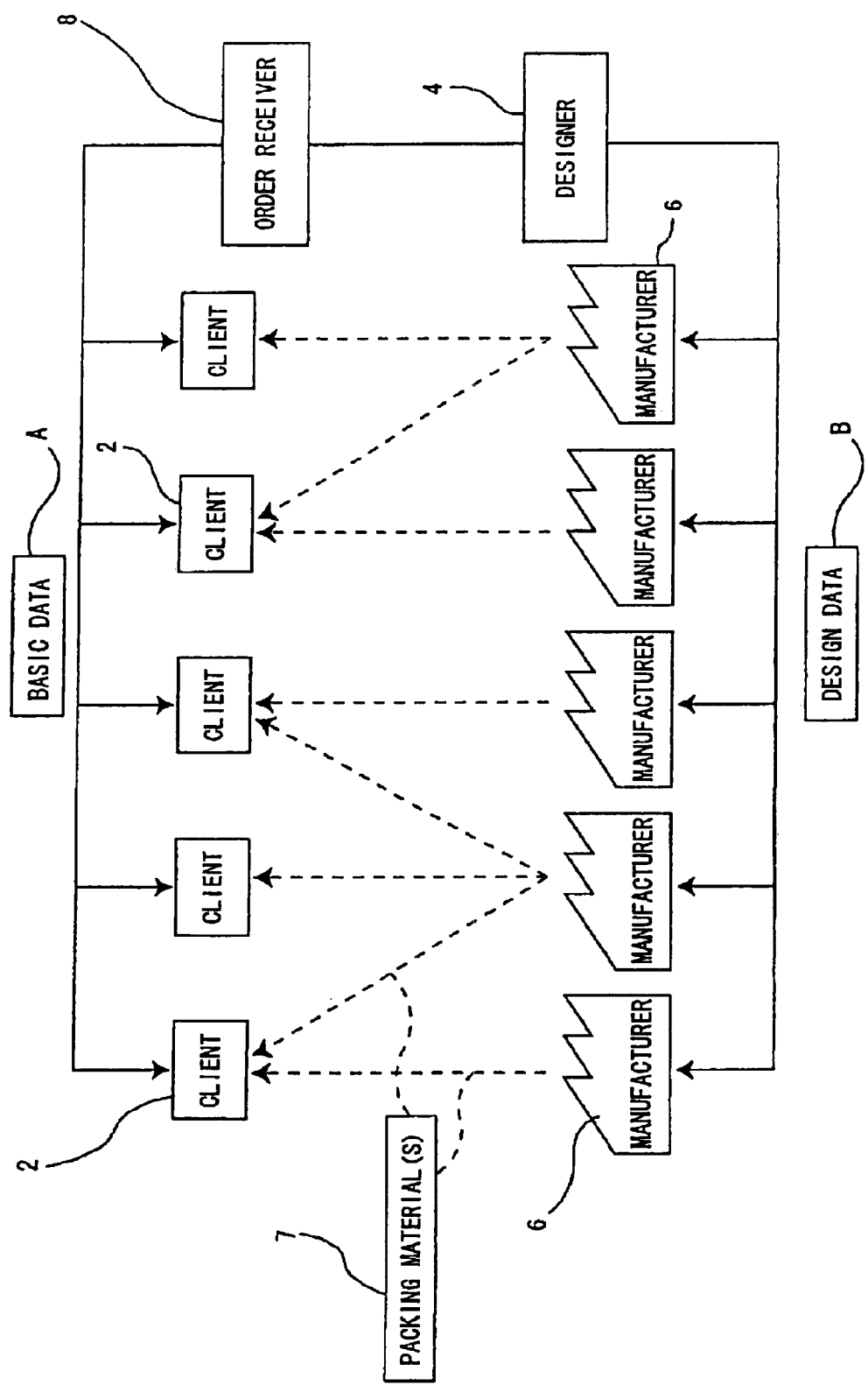
FIG. 3 is a diagram for explanatorily showing one exemplary mode of whole processes from an ordering step to a delivering step among plural clients, an order receiver, a designer and plural manufactures, on the basis of the order-receiving and delivery system of the present invention.
Figure 4:
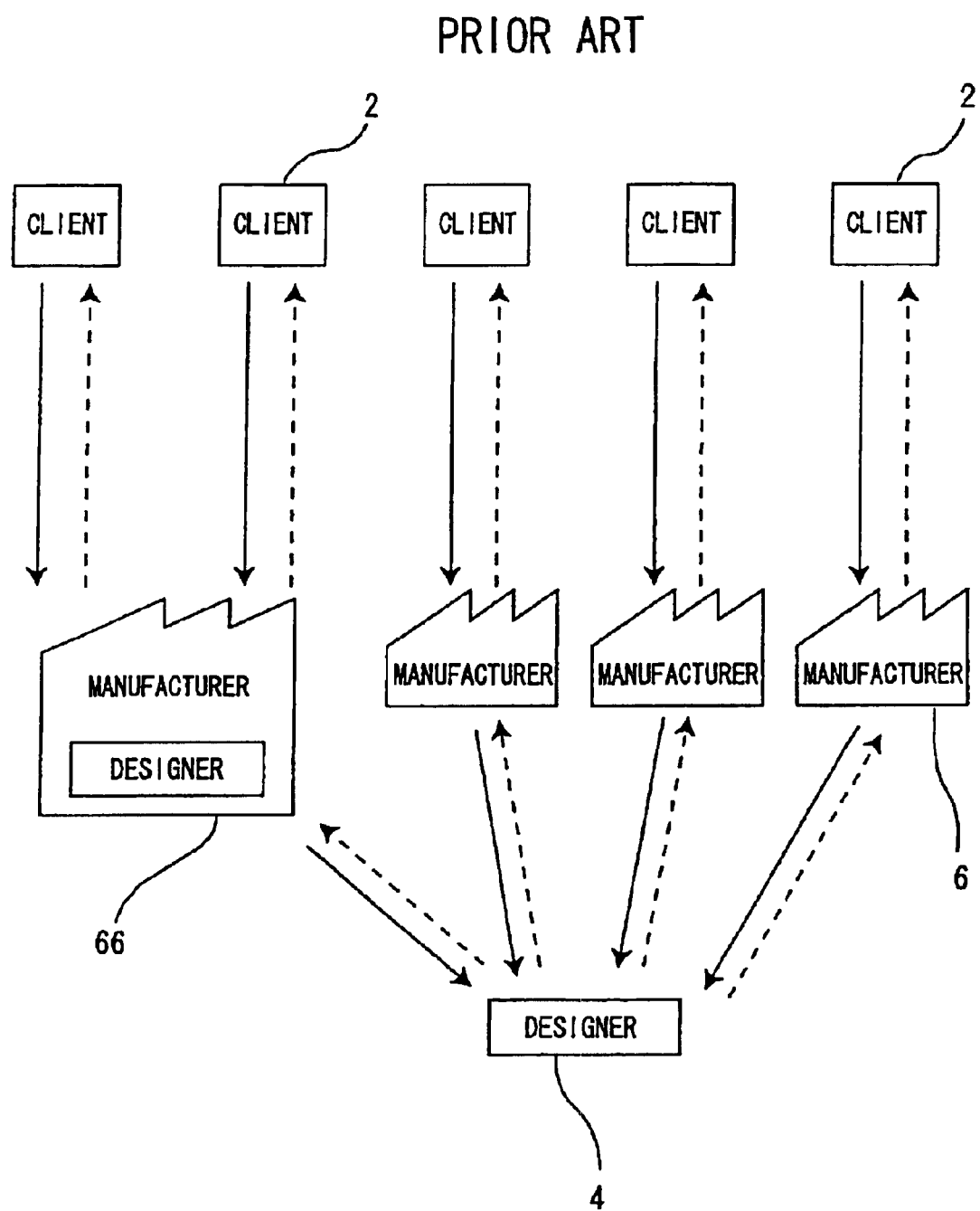
FIG. 4 is a diagram for explanatorily showing a conventional process for ordering and delivery of packaging medium or packing materials.

In this context, referring to FIG. 3, the designer 4 and order receiver 8 may be identical in entity with each other; namely, one and the same person or legal entity working as both designer and order receiver (of course, this definition also applies to one and the same legal entity for which both designer 4 and order receiver 8 work), and, the designer 4 and manufacturer 6 be identical in entity with each other, which means that one and the same person or legal entity can work as both designer and manufacturer (of course, including one and the same legal entity for which both designer 4 and manufacturer 6 work). Or, alternatively, all the order receiver 8, designer 4 and manufacturer 6 may be identical in entity with one another; which refers to the case where one and the same person works to receive an order, design a packing material(s) and manufacture a resulting packing material(s) 7, or refers to one and the same legal entity in which all the order receiver 8, designer 4 and manufacturer 6 are incorporated together. Further, the afore-stated packing material dealer or selling agency may be identical with or incorporated in one or at least two of those order receiver 8, designer 4 and manufacturer 6 so as to form one and the same legal entity.

Figure 2:
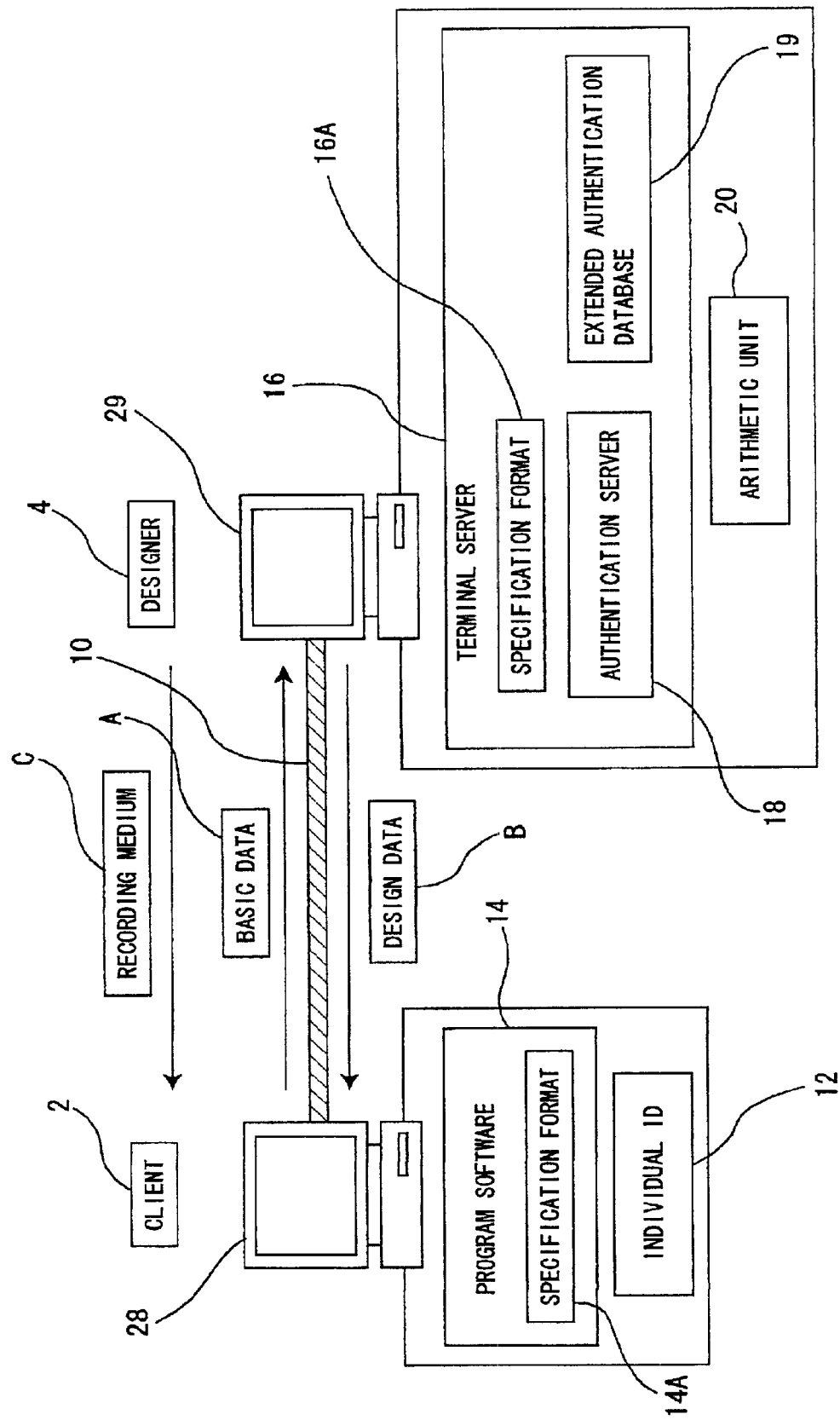
FIG. 2 is a diagram for explanatorily showing the relation between a client and a designer on the basis of the order-receiving and delivery system of the present invention.

As shown in FIG. 2, the designer 4 is provided with: a connection and communication means 10 for allowing the designer to effect a data receiving and transmission with the client 2; a terminal server 16 including: an authentication server 18 which, responsive to an access of the client 2, will determine if an individual ID (e.g. an identification number, character or symbol) of the client 2 is validated or not; and an extended authentication database 19 which stores and controls a basic data A transmitted from the client 2, as one record unit, together with one individual client information on that particular client 2; and an arithmetic unit 20 which processes the basic data A inputted therein from the terminal server 16 and converts it into a design data B.

In general, the basic data A contains an information for design about a packing material(s) contemplated by the client 2 (for example, a sketch of the packing material(s) and an explanation thereon, which are basically necessary for designing by the designer 4), whereas the design data B contains design drawings prepared by the designer 4 according to the basic data A and some information added by the designer 4, which is required in manufacturing the packing material(s).

On the other hand, the client 2 is likewise provided with the connection and communication means 10 which enables him or her to establish a connection to the aforesaid terminal sever 16 and also provided with an individual ID 12 that qualifies the client to gain an authorized access to the aforesaid terminal server 16.

The connection and communication means 10, possessed by the client 2 and designer 4, may include a telephone system, a facsimile communication system, an Internet connection services, and the like. But, this is not imitative, and the client and designer may set any suitable manner of communication and connection between them.

In carrying out the packing material order-receiving and delivery system of the present invention, it is preferable that both client 2 and designer 4 have their respective computer systems 28, 29 for mutual exchanges of data and information between them and for data processing and controls under suited environments. The computer systems 28, 29 may be home or personal computers, custom-built computers or other kinds of computers, insofar as they serve the purposes of the present invention.

Now, a specific description will be made of the designer 4 in the present order-receiving and delivery system, with reference to FIGS. 1A, 1B and 2. As shown in FIG. 2, the designer 4 has a terminal server 16 in his or her computer system 29, the terminal server 16 having, provided therein, an authentication server 18 and an extended authentication database 19, at least.

In accordance with the present invention, the operation of the authentication server 18 is such that, responsive to an individual ID 12 being inputted therein from the client 2, the server 18 checks the ID 12 against a corresponding authenticated data of the client 2 stored in the extended authentication database 19 and then determines whether the inputted ID 12 matches the authenticated data or not and whether to accept the client's access to the terminal server 16.

The extended authentication database 19, upon receiving a basic data A transmitted from the client 2, works to store and control the basic data A in one block together with an individual client information on that particular client 2. Further, a design data B, which is created by the designer 4 about a design of packing material(s) on the basis of the client's basic data A, is also stored in the extended authentication database 19 and controlled thereby in the foregoing one block together with an individual client information on the same client 2.

The terminal server 16 is not imitative, but may have other various functions than described above.

The arithmetic unit 20 performs arithmetic computing of the afore-stated basic data A transmitted from the client 2 and converts it into a proper design data B. In this respect, a certain program software 14 may be installed in the computer system 28, by means of which, the basic data A, upon its being inputted therein, is immediately and automatically subjected to computing by the arithmetic unit 20 and converted into the design data B. Of course, the creation of design data A is not limited thereto, and for instance, the basic data A may be manually processed by the designer 5 and/or an information processing expert for conversion into a proper design data B, or may be processed by the program software 14 and the designer 5 and/or information processing expert, for that purpose. The program software 14 may be a commonly available design software known as CAD (Computer Aided Design) software or any other suitable software. Also, the program software 14 be developed and created by the designer 4 into a new mode of software workable to meet all the requirements in the present invention, using various known suitable software, such as a commonly available design software and word processor software. It is to be understood, however, that the term, "program software 14", appearing in the present description and annexed drawings, refers to a generic concept of software which can deal with various data processing between the client 2 and designer 4, such as electronic connections, transactions, data transmissions, Internet browsing, data encoding/decoding, system configurations and various data management between them. It is therefore not limited to one particular software, but may include a plurality of separate software each being adaptable for a particular use according to required environments within the gist and purposes of the present invention or may include a desired combination of those separate software, as will become apparent later. Hence, the parenthesize designation "(14)", which also refers to the above-discussed concept of program software, will be given commonly to each of different program software that will be described below, for the sake of simplicity in description.

In accordance with the present invention, the packing material order-receiving and delivery system features involving the process where, prior to connection to the terminal server 16, the client 2 has to obtain an individual ID 12 and program software 14 from the designer 4. In his case, the program software 14 is a connection software adapted to permit connection of the client 2 to the terminal server 16 via the connection and communication means 10 (for example, the connection software may be a known Internet browsing program or the like).

As seen in FIG. 2, the client 2 can obtain those ID 12 and program software 14 by way of a recording medium C (e.g. floppy disk or CD-ROM) which has, recorded therein, a data about such ID 12 and connection software (14), or by way of an electronic data containing those particular data and software. For instance, upon request by the client 2, the designer 4 may hand over directly to the client 2 a recording medium C bearing an individual ID 12 and the connection software (14) for connection to the terminal server 16, or may deliver the recording medium C by mail or via parcel delivery service to the client 12. Alternatively, the client 2 may obtain (download) such individual ID 12 and the connection software (14) by way of electronic data. For instance, the client 2 may download the connection software (14) by way of electronic data over the Internet, and thereafter request sing-up entry or registration to the designer 4 so as to receive an individual ID 12 issued therefrom. But, obtaining the ID and program software may be effected in various other manners than the foregoing processes, insofar as the client 2 can obtain them in any assured manner and the designer 4 can easily recognize the client 2, while preventing any unauthorized or unlawful access to the designer 4 for the program software and ID.

The above-mentioned recording medium or electronic data may also contain another program software (14) adapted for creation of the basic data A, in addition to containing the individual ID 12 and the foregoing connection program software for connection to the terminal server 16. However, such basic data creation software (14) may be provided independently of the connection software (14), or instead thereof, one program software (14) be provided, which includes functions not only for connection to the terminal server 16 but also for creation of the basic data A. The basic data creation software (14) further includes a specification format 14A, a format prepared by the designer 4, which contains several items, frames and drawing sections in which for the client 2 to make necessary entries and input detailed specifications, conditions and sketches regarding a packing material(s) to be ordered. Using such specification format 14A, the client 2 can input a detailed information and draft drawings or sketches associated with a packing material(s) to be ordered, and store them as a basic data A in his or her computer 28 via the program software 14.

Further, in accordance with the present invention, the packing material order-receiving and delivery system features involving the step where the client 2 transmits the basic data A to the designer 4. At this step, the client 2, after having created the basic data A by the above-described program software 14 and specification format 14A, may transmit the data A to the terminal server 16 of the designer 4. Or, alternatively, subsequent to his or her connection to the terminal server 16, the client 2 may create a basic data A on the basis of a specification format 16A provided in the terminal server 16. The specification format 16A may be the same as the previously stated specification format 14A contained in the program software 14. In any case, transmission of the basic data A to the terminal server 16 may be executed in various ways possible within the gist of the present invention.

Still further, the present packing material order-receiving and delivery system features involving the step where the client 2 obtains a design data B from the designer 4, the design data B having been created by that designer 4, and then takes at least one or more actions to review the design data B and check to see if it complies with what the client 2 actually requires or not regarding the ordered packing material(s). At this stage, the client 2 may establish connection to the terminal server 16 for authorized access to the design data B stored therein, and directly watch and review the contents of design data B on the display screen of his or her computer system 28. Or, alternatively, the client 2 may obtain (download) the design data B by way of electronic data from the terminal server 16 and then check the contents thereof. Still another alternative way is such that the client 2 may have the design data B recorded by the designer 4 on a recording medium C, after which, the designer 4 may hand over or mail the recording medium C to the client 2, or alternatively, the designer 4 may transmit (upload) the design data B to the client by way of electronic data.

When having obtained the design data B in any one of the ways described above, the client 2 checks the resulting design of packing material in the design data B. If the design requires any change or correction, the client 2 notifies the designer 4 thereof so that the design data B is revised or reconfigured by the designer 4 appropriately according to the change or correction. On the other hand, if the original design data B obtained from the designer 4 is found to be acceptable, the client 2 notifies the designer 4 of his or her acceptance or agreement. In that case, the original design data B (non-corrected), which is stored in the extended authentication database 19, is directly transmitted from the designer 4 to the packing material manufacturer 6.

The exchanges of communication between the client 2 and designer 4 are normally based on the above-stated connection and communication means 10, but may be made via any other suitable means. The manufacturer 6 also has a computer system (not shown) capable of connection and communication with the designer's computer system 29, to receive the design data B from the designer 4, on the basis of which data B, the manufacturer 6 attends to manufacturing an ordered packing material(s) 7.

In this connection, the basic data A and design data B may be encoded, as by encryption, into a particular data form that can only be decoded or reconstituted by the program software 14 that is obtained by the client 2 from the designer 4. Namely, the program software 14 may include a function for decoding or reconstituting either of the basic data A and design data B into a proper form of data (or data format) readable and viewable by the client 2 or designer 4. Hence, the client 2 may use the program software 14 to decode the design data B so as to visualize the design drawings that the designer 4 has created, and watch it on the display screen of computer system 28.

It should be noted that the aforementioned ordering step, where the client 2 places an order with the order receiver 8 for a packing material(s), may be defined as the point of time when the client 2 establishes connection to the terminal server 16 and transmits a basic data A to the designer 4, or may be defined as the point of time when the client 2 accepts the design data B after having checked it, and notifies the designer 4 of his or her affirmative reply to the designer 4 about the design data B. In ordinary, as indicated by the designation I in FIG. 1, it is the point of order commencement or ordering point when the client 2 establishes connection to the terminal server 16 via the order receiver 8 and transmits a basic data A to the designer 4. However, the present invention has no particular definition on the ordering step or ordering point, and, therefore, whether or not the client 2 actually places an order may be determined properly in the trusted communication between the client 2, the designer 4 and/or the order receiver 8.

FIG. 3 schematically shows one exemplary flow of a whole transaction among the clients 2, order receiver 8, designer 4 and manufacturers 6, which is carried out by the present order-receiving and delivery system. Brief explanation will be made thereon in conjunction with FIG. 2. In the present embodiment, an order receiver 8 deals with plural orders from a plurality of different clients 2, respectively, for different packing materials. Of course, each of the clients 2 has a computer system 28 capable of electronic connection to a computer system 29 of the designer 4 (and/or the order receiver 8), and also has obtained an individual ID 12 and program software 14 from the designer 4, likewise as described previously. As can be seen from the FIG. 3, a plurality of basic data A are transmitted from the plural clients 2 to the designer 4 who in turn creates an appropriate design data B corresponding to each of the different clients' basic data 24 (via the arithmetic unit 20 for instance) and transmits the design data B to each of the clients. Then, after having checked and accepted their design data B, the clients 2 convey their acceptance to the designer 4. As shown, there are a plurality of packing material manufacturers 6 who have a business relation with the designer 4. Thus, responsive to such acceptance from the clients 2, the designer 4 selects a most appropriate one of the plural manufacturers 6, taking into account its ability to meet each of the clients' design conditions for packing material(s), and requests the selected manufacturer 6 to produce a predetermined number of packing materials 7 on the basis of the design data B. Finally, as indicated by the dashed arrows in FIG. 3, the resulting packing materials 7 are delivered from each of the manufacturers 6 to the respective clients 2. It is to be appreciated that the designer 4 can effect a direct bilateral data transmission with each of the clients 2 and a most appropriate one of the manufacturers 6, considering the nature and design of the client's ordered packing material(s).

In the present mode, in brief, as implied by X, the designer 4 and order receiver 8 may be identical with each other as one and the same person or legal entity, and the designer 4 and manufacturer 6 be identical with each other to form one and the same legal entity, as implied by Y. Further, as implied by Z, all the order receiver 8, designer 4 and manufacturer 6 may be identical with one another to form one and the same legal entity or incorporated together as one and the same legal entity. The detailed definitions in this regard have been already discussed above, and repetition thereof is omitted for the sake of simplicity.

Now, referring again to FIGS. 1A, 1B and 2, partly in conjunction with FIG. 3, a specific description will be made about one exemplary mode of the whole steps to be pursued by the client 2, designer 4 and manufacturer 6, including the order receiver 8, in accordance with the order-receiving and delivery system of the present invention. In this particular embodiment, it is premised that all connections, communications, notifications and data transmissions among the client 2, order receiver 8 and designer 4 are effected via the connection and communication means 10, and that, though not shown, the same goes for the relation between the designer 4 and manufacturer 8. Associated with the order receiver 8 is a transmitter 8A which transmits program data from the designer (4) to the client (2).

First of all, as indicated at the step 21, the client 2 obtains a recording medium C, which bears an individual ID and program software 14, from the designer 4 in the manner described previously, wherein the program software 14 contains functions for connection to the terminal server 16 and for creation of a basic data A, for instance, as stated earlier.

Then, client 2 sets up the recording medium C on his or her computer system 28 and installs the program software 14 thereinto, so that an optimal environment is established, in which the client 2 can attain a connection to the terminal server 16 of the designer 4 and create a basic data A concerning a desired packing material(s) to be manufactured.

At the next step 22, the client 2 inputs the assigned individual ID for access to the terminal server 16, whereupon the client 2 establishes an authorized connection to that sever 16. As indicated by the designation I, the order receiver 8 is now in an electronic communication with the client 2. At step 21A the client creates basic data A which includes conditions and requirements. Then, at the step 23, the client 2 transmits the basic data A via the order receiver 8 to the designer 4, at which time, such client's action is determined by the order receiver 8 to be a formal order and therefore the basic data A is allowed to be transmitted to the designer 4.

At the designer's step 41, the computer system 29, which is operated by the designer 4, receives the basic data A, permits the client's access via the authentication server 18, and works under a particular coding of the program software 14 so as to automatically subject the basic data A to arithmetic processing by the arithmetic unit 20, whereby the data A is converted into an appropriate design data B. The design data B so created is then stored and controlled in the extended authentication database 19. In this respect, instead of such automated data conversion, the designer 4 may directly convert the basic data A (appearing on the display screen of computer system 29) into an appropriate design data B and causes it be stored in the extended authentication database 19. Data A may also be manually processed at step 41.

When having worked up the design data B, the designer 4 notifies the client 2 of the design data completion, as at the step 42. Prior to connection to the terminal server for design review, the client obtains program software and recording medium at step 24A. The software contains functions for decoding and reconstituting design data B into an appropriate form of data viewable by the client.

Next step followed by such step 42 is the client's checking step at 24 where the client 2 reviews and checks the design data B on his or her computer system 28. That is, upon receiving the designer's notification on the completion of design data B, the client 2 establishes authorized connection via the computer system 28 to the terminal server 16 in the designer's computer system 29, and obtains (downloads) the completed design data B from the terminal server 16. Then, the client 2 watches the details of the design data B (i.e. design drawings showing the structure of ordered packing material(s) and the related information) on the display screen of computer system 28 and checks to see if it complies with what he or she actually requires about the packing material(s) to be manufactured.

Where there is any change or correction required in the design data B, as indicated at the step 25, the client 2 notifies the designer 4 thereof, in which case, an appropriate change or correction is made to the design data B by the designer 4 on the computer system 29, as at the step 43. When having worked up the changed or corrected design data (B), the designer 4 notifies the client 2 of such completion of change or correction, as at the step 44.

Turning now back to the step 24, the client 2, upon receipt of the changed or corrected design data (B), checks it again with care. And, if there is no further change or correction to be added therein, then the client 2 notifies the designer 4 of his or her acceptance of the changed or corrected design data (B), as at the step 26.

Conversely, if the original design data B requires neither change nor correction at the client's checking step 24, the client 2 simply conveys his or her reply in the affirmative (i.e. accepting the original design data B) to the designer 4, as indicated by the step 26.

It is noted that the design data B, be it the original non-corrected one or any corrected/changed one, remains stored in the designer's extended authentication database 19.

Figure 1B:
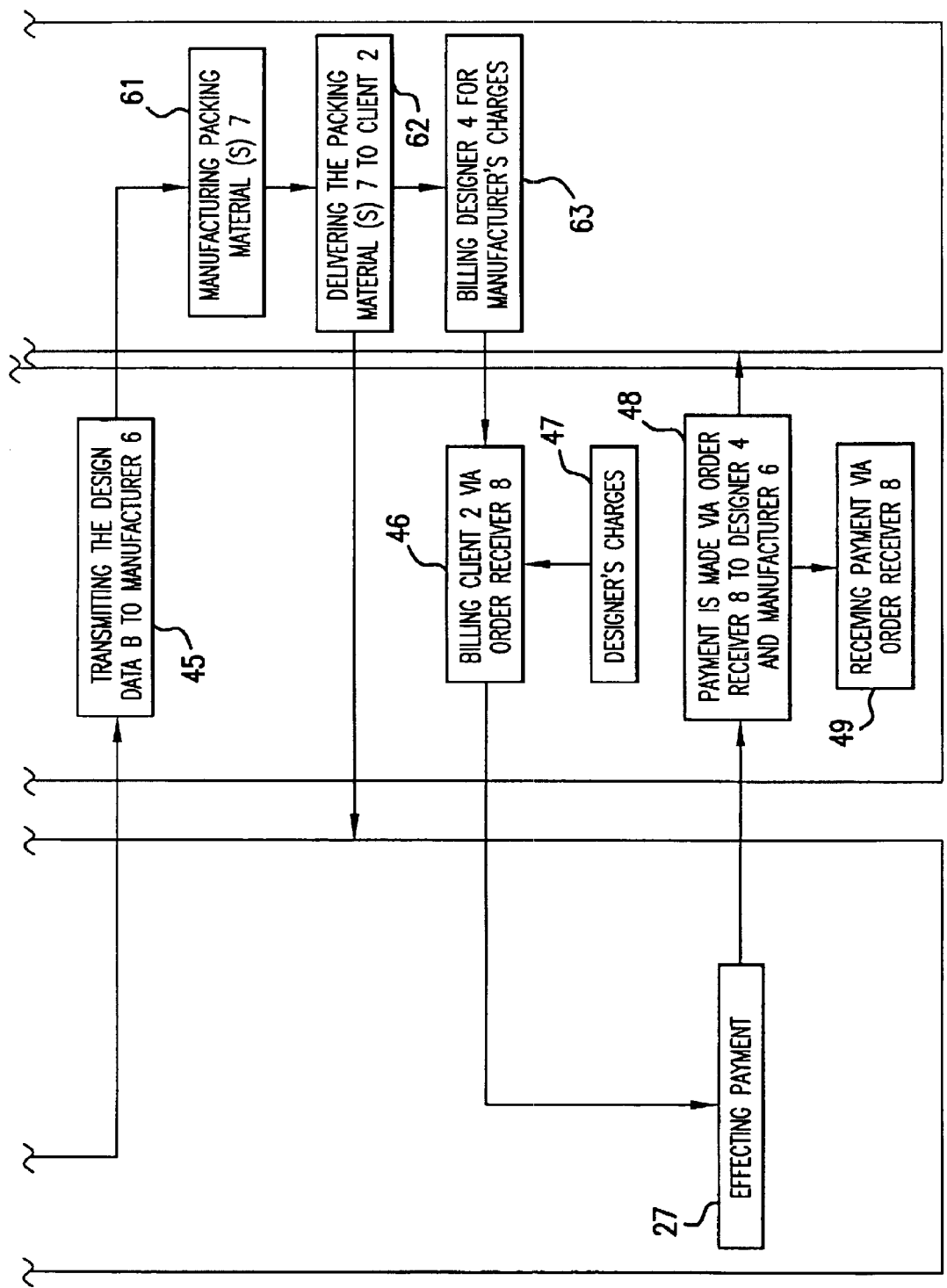

Responsive to the foregoing client's acceptance of the design data B, the designer 4 operates the computer system 29 so as to transmit the design data B from the extended authentication database 19 to a manufacturer 6, as indicated at the step 45 in FIG. 1B. Though not shown, the manufacturer 6 has a computer system capable of connection and communication with the designer 4 and client 2, and data transmission or other necessary transactions with them, in substantially the same way as the above-described connection and communication ways between the client 2 and designer 4.

Step is now directed to the manufacturing stage where, as indicated at the step 61 in FIG. 1B, upon receiving the design data B from the designer 4, the manufacturer 6 attends to manufacturing packing materials (at the designation 7 in FIG. 3) according to the detailed information of design data B.

After the completion of manufacturing the packing materials (at 7), the manufacturer 6 delivers them on to the client 2 at the step 62, and bills the designer's side for charges involved in manufacturing the packing materials (at 7), as at the step 63.

In the present mode, as understandable from the steps 46 and 47, the order receiver 8 controls the charges of both designer 4 and manufacturer 6 and bills the client 2 for the total charges accumulated therefrom. In other words, while being billed from the manufacturer 6 as stated above, the order receiver 8 also ascertains the charges of designer 4 as indicated by the step 47 and the associated arrow directed to the step 46. Therefore, the order receiver 8 bills the client 2 for the total charges of both designer 4 and manufacturer 6, as at the step 46.

On the other hand, the client 2 has received the resultant packing materials 7 from the manufacturer 6, and also, he or she acknowledges the foregoing order receivers billing. Therefore, at the step 27, payment is effected by the client 2 to the order receiver 8 in settlement of the charges billed.

Upon receipt of the payment, the order receiver 8 arranges to allocate the paid sum to the two different accounts respectively associated with the designer 4 and manufacturer 6. Namely, payment is made via the order receiver 8 to both designer 4 and manufacturer 6, as indicated at the step 48. Then, the designer 6 receives the payment for his or her charges at the final step 49.

The above-described billing and payment may be effected in a suitable matter, such as in an on-line electronic manner (i.e. electronic billing and payment in a bank on-line system), taking the advantages of the computer systems 28, 29 as well as the manufacturer's computer system (not shown).

While having described the present invention thus far, it should be understood that the invention is not limited to the illustrated embodiment and descriptions above, but other various modifications, replacements and additions may be structurally and methodologically applied thereto without departing from the gist of the present invention and the scopes of the appended claims.

EFFECTS OF THE PRESENT INVENTION

Accordingly, it is appreciated that the packing material order-receiving and delivery system in accordance with the present invention has the following features and advantages:

(i) The basic data and design data can be directly exchanged between the client and designer at any time, so that the designer can take any immediate action responsive to a request from the client. This effectively makes it possible to develop an optimum packing material that reflects and materializes various demands of the client.

(ii) Each of clients is assigned with an individual D from one designer, whereby the designer can completely recognize which of the clients orders a particular packing material (s), and also, it is possible to prevent any leakage of important design data, which is, for example, caused by any unauthorized or unlawful access to the designer from other packing material competitor dealers or manufacturers who pretend to be ordinary or innocent clients.

(iii) All orders from the clients can be collectively controlled by one order receiver, so that the designer can concentrate on designing each of the ordered packing materials and then request the manufacturer to produce a best mode of packing material that meets the requirements and conditions proposed by the client. Thus, a great number of orders can be handled by one order receiver precisely and each of the basic data can be stored assuredly in the extended authentication database, from which the designer can readily attend to designing a packing material(s) per client, while being able to have sufficient communications with each of plural clients at any time. Further, such high-efficient concentration of designer on his or her designing works and accumulation of many design data in the database are an important basis that leads to a great improvement of designer's ability and expertise.

(iv) Since a great number of orders can be simply handled by order receiver, there is no unnecessary extra cost incurred on the designer's side, thus making it possible to reduce costs involved in design works, which therefore leads to a price reduction of packing material(s).

What is claimed is:

1. A system for order-receiving and delivery of a packaging medium which is adapted to package an article, which includes: an ordering step where a client places an order with an order receiver for the packaging medium; a designing step where a designer creates a design of the ordered packaging medium according to conditions and requirements proposed by the client; a manufacturing step where a packaging medium manufacturer manufactures a packaging medium on basis of said design as well as said conditions and requirements; and a delivering step where a resulting packaging medium thus manufactured is delivered to the client, wherein said system for order-receiving and delivery of a packaging medium is characterized in that:

said designer is at least provided with:

a connection and communication system enabling the designer to receive and transmit a data from and to said client;

a terminal server including: an authentication server which, responsive to an access of said client, operates to determine whether an ID of the client is validated or not; and an extended authentication database which stores and controls a basic data transmitted from said client, as one record unit, together with one individual client information on said particular client; and an arithmetic unit for processing and converting said basic data into a design data; and said client is provided with:

a connection and communication system capable of establishing a connection to said terminal server; and an individual ID that qualifies the client to have an authorized access to the terminal server, wherein said client takes at least one or more actions to check to see whether said design data complies with said conditions and requirements proposed by the client, or not.

2. The system as claimed in claim 1, wherein said data comprises a basic data containing conditions and requirements for design about said packaging medium, and wherein said basic data is automatically subjected to arithmetic computing by said arithmetic unit or subjected to arithmetic processing by the arithmetic unit and/or a manual processing, so that the basic data is converted into a design data.

3. The system as claimed in claim 1, wherein, in settlement of charges of said packaging medium manufacturer for the resulting packing material that has been delivered to said client, payment is effected from said client, via said order receiver, to the packaging medium manufacturer.

4. The system as claimed in claim 1, wherein said designer and order receiver are identical in entity with each other.

5. The system as claimed in claim 1, wherein said designer and packaging medium manufacturer are identical in entity with each other.

6. The system as claimed in claim 1, wherein, prior to connection to said terminal server, said client at least obtains said individual ID and a program software from said designer, said program software being adapted for allowing connection of the client to said terminal server.

7. The system according to claim 6, wherein, prior to connection to said terminal server, said client obtains a recording medium from said designer, said recording medium containing at least said individual ID and said program software.

8. In the system as claimed in claim 7, a designing process characterized in that said terminal server has a specification format provided therein, on the basis of which, a basic data is inputted in the extended authentication database, said basic data containing an information for design about the packaging medium, and that said client establishes connection to said terminal server and inputs said basic data via said specification format in the extended authentication database of the terminal server, whereby said basic data is transmitted from said client to said designer.

9. The designing process according to claim 8, wherein said basic data is converted into a design data, and wherein said client, after having established connection to said terminal server, checks to see whether said design data complies with conditions and requirements proposed by the client, or not, on the terminal server.

10. The system as claimed in claim 7, wherein said program software includes: a function for allowing connection to said terminal server; a function for creating a basic data which contains an information for design about the packaging medium, and a function for decoding and reconstituting said design data into an appropriate form of data readable and viewable by said client.

11. In the system as claimed in claim 10, a designing process characterized in that said client creates said basic data, using said program software, thereafter establishes connection to said terminal server, and transmits the thus-created basic data to said designer.

12. The designing process according to claim 11, wherein said client receives said design data from said designer and checks to see whether the design data complies with conditions and requirements proposed by the client, or not, via said program software.

13. The system as claimed in claim 3, wherein said designer and order receiver are identical in entity with each other.

14. The system as claimed in claim 3, wherein said designer and packaging medium manufacturer are identical in entity with each other.

15. The system as claimed in claim 4, wherein said designer and packaging medium manufacturer are identical in entity with each other.

16. The system as claimed in claim 2, wherein, prior to connection to said terminal server, said client at least obtains said individual ID and a program software from said designer, said program software being adapted for allowing connection of the client to said terminal server.

17. The system as claimed in claim 3, wherein, prior to connection to said terminal server, said client at least obtains said individual ID and a program software from said designer, said program software being adapted for allowing connection of the client to said terminal server.

18. The system as claimed in claim 4, wherein, prior to connection to said terminal server, said client at least obtains said individual ID and a program software from said designer, said program software being adapted for allowing connection of the client to said terminal server.

19. The system as claimed in claim 5, wherein, prior to connection to said terminal server, said client at least obtains said individual ID and a program software from said designer, said program software being adapted for allowing connection of the client to said terminal server.

* * * * *